(12) United States Patent
Rowen et al.

(10) Patent No.: US 9,472,919 B2
(45) Date of Patent: Oct. 18, 2016

(54) GENERATION OF NARROW LINE WIDTH HIGH POWER OPTICAL PULSES

(71) Applicant: V-GEN Ltd., Tel Aviv (IL)

(72) Inventors: Eitan Emanuel Rowen, Modiin (IL); Jacob Lasri, Hod HaSharon (IL); Eran Inbar, Tel Aviv (IL)

(73) Assignee: V-gen Ltd., Tel Aviv (IL)

( * ) Notice: Subject to any disclaimer, the term of this patent is extended or adjusted under 35 U.S.C. 154(b) by 0 days.

(21) Appl. No.: 14/401,870

(22) PCT Filed: May 20, 2013

(86) PCT No.: PCT/IB2013/054139
§ 371 (c)(1),
(2) Date: Nov. 18, 2014

(87) PCT Pub. No.: WO2013/175387
PCT Pub. Date: Nov. 28, 2013

(65) Prior Publication Data
US 2015/0131145 A1    May 14, 2015

Related U.S. Application Data

(60) Provisional application No. 61/649,374, filed on May 21, 2012.

(30) Foreign Application Priority Data

Aug. 27, 2012  (GB) .................................. 1215207.0

(51) Int. Cl.
*H01S 3/00* (2006.01)
*H01S 3/067* (2006.01)
(Continued)

(52) U.S. Cl.
CPC ....... *H01S 3/06754* (2013.01); *H01S 3/06716* (2013.01); *H01S 3/1618* (2013.01); *H01S 3/302* (2013.01); *H01S 3/10015* (2013.01); *H01S 3/2308* (2013.01); *H01S 3/2375* (2013.01)

(58) Field of Classification Search
CPC ............. H01S 3/06754; H01S 3/2308; H01S 3/1618; H01S 3/2375; H01S 3/302; H01S 3/10015; H01S 3/06716
USPC ......................................................... 359/334
See application file for complete search history.

(56) References Cited

U.S. PATENT DOCUMENTS 6,466,363 B1    10/2002  Masum-Thomas et al.
7,283,714 B1 *  10/2007  Gapontsev ......... G02B 6/02009
                                                                359/341.1

(Continued)

FOREIGN PATENT DOCUMENTS

WO      03029851 A2     4/2003
WO      2007127356 A2   11/2007

OTHER PUBLICATIONS

Singh, Sunil Pratap, Ramgopal Gangwar, and Nar Singh. "Nonlinear scattering effects in optical fibers." Progress in Electromagnetics Research 74 (2007): 379-405.

(Continued)

*Primary Examiner* — Mark Hellner
(74) *Attorney, Agent, or Firm* — Dr. Hanan Farber Patent Agent Ltd.

(57) ABSTRACT

Narrow line width, high power pulses of optical radiation may be generated by the combination of stimulated emission and stimulated Raman scattering within a rare earth doped optical fibre (24b). The signals of a first (11) and second (13) seed laser sources are coupled into the fiber. The radiation of the pulsed first seed laser source (11) is amplified by stimulated emission of the rare earth ions so that the threshold for stimulated Raman scattering into the mode of the second seed laser source 13 is exceeded, and efficient SRS transfers nearly all the power into the mode seeded by the second seed laser source (13).

16 Claims, 4 Drawing Sheets

(51) Int. Cl.
*H01S 3/16* (2006.01)
*H01S 3/30* (2006.01)
*H01S 3/23* (2006.01)
*H01S 3/10* (2006.01)

(56) References Cited

U.S. PATENT DOCUMENTS

| | | | |
|---|---|---|---|
| 7,420,994 B2* | 9/2008 | Korolev | H01S 3/302 372/3 |
| 7,787,729 B2* | 8/2010 | Dong | G02B 6/02 385/123 |
| 2005/0024716 A1 | 2/2005 | Nilsson et al. | |
| 2006/0029111 A1* | 2/2006 | Liu | H01S 3/06708 372/6 |
| 2006/0198397 A1* | 9/2006 | Korolev | H01S 3/302 372/3 |
| 2009/0080835 A1* | 3/2009 | Frith | G02B 6/14 385/50 |
| 2009/0097512 A1* | 4/2009 | Clowes | G02B 21/16 372/21 |
| 2009/0262761 A1* | 10/2009 | Khitrov | H01S 3/06754 372/6 |
| 2010/0290106 A1 | 11/2010 | DiGiovanni et al. | |
| 2010/0302626 A1 | 12/2010 | Kakui | |
| 2011/0249321 A1* | 10/2011 | Savage-Leuchs | G02B 6/02009 359/341.3 |
| 2011/0286084 A1 | 11/2011 | Tomita | |
| 2013/0335812 A1 | 12/2013 | Johnson | |

OTHER PUBLICATIONS

Feng, Yan, Luke R. Taylor, and Domenico Bonaccini Calia. "25 W Raman-fiber-amplifier-based 589 nm laser for laser guide star." Optics express 17.21 (2009): 19021-19026.
UK Intellectual property Office, Combined Search and Examination Report under Sections 17 and 18(3), Feb. 4, 2013, App No. GB1215207.0.
Codemard, Christophe André. High-power cladding-pumped Raman and erbium-ytterbium doped fibre sources. Diss. University of Southampton, 2007.
Dianov, E. M., and V. Mamyshev. "Stimulated-Raman conversion of multisoliton pulses in." JETP Lett 41.6 (1985).
Nicholson, J. W., Taunay, T., Monberg, E., DiMarcello, F., Li, Y., & Ng, J. (Feb. 2012). All-in-one 1236-nm Yb/Raman fiber laser. In SPIE LASE (pp. 823733-823733). International Society for Optics and Photonics.
Dianov, Evgenii Mikhailovich, et al. "CW bismuth fibre laser." Quantum Electronics 35.12 (2005): 1083-1084.
Feng, Yan, et al. "589 nm light source based on Raman fiber laser." Japanese journal of applied physics 43.6A (2004): L722.
Feng, Yan, Luke Taylor, and Domenico Bonaccini Calia. "Multiwatts narrow linewidth fiber Raman amplifiers." Optics express 16.15 (2008): 10927-10932.
Kurkov, A. S., V. M. Paramonov, and O. I. Medvedkov. "Ytterbium fiber laser emitting at 1160 nm." Laser Physics Letters 3.10 (2006): 503-506.
Olausson, C. B., et al. "167 W, power scalable ytterbium-doped photonic bandgap fiber amplifier at 1178nm." Optics express 18.16 (2010): 16345-16352.
International Search Report, App No. PCT/IB2013/054139, Oct. 10, 2013.
Written Opinion of the International Searching Authority, App No. PCT/IB2013/054139.
Shirakawa, A., et al. "High-power Yb-doped photonic bandgap fiber amplifier at 1150-1200 nm." Optics express 17.2 (2009): 447-454.
Sinha, Supriyo, et al. "Efficient yellow-light generation by frequency doubling a narrow-linewidth 1150 nm ytterbium fiber oscillator." Optics letters 31.3 (2006): 347-349.
UK Intellectual Property Office, Examination Report under Section 18(3), Feb. 17, 2016, App No. GB1215207.0.
UK Intellectual Property Office, Examination Report under Section 18(3), Jun. 29, 2015, App No. GB1215207.0.
Jian, Zhao, et al. "1 MW peak power, sub-nanosecond master oscillator fiber power amplifier." Photonics and Optoelectronics (SOPO), 2011 Symposium on. IEEE, 2011.
Dong, Z. Y., et al. "High peak power green light generation using ytterbium fiber amplifier and lithium triborate crystal" Laser Physics 21.10 (2011): 1804-1807.
Kevin Farley, George Oulundsen, and Kanishka Tankala, "Fiber Lasers: Selecting large-mode-area Fibers for high-power lasers" Jan. 17, 2014, http://www.laserfocusworld.com/articles/print/volume-50/issue-01/features/riber-lasers-selecting-large-mode-area-fibers-for-high-power-lasers.html.
DR Rudiger Paschotta, Encyclopedia of Laser Physics and Technology—large mode area fibers, LMA fiber, nonlinearities, https://www.rp-photonics.com/large_mode_area_fibers.html, as of Apr. 19, 2016.
Fibercore, Large Mode Area (LMA) fiber, website as of Apr. 19, 2016, http://fibercore.com/fiberpaedia/large-mode-area-Ima-fiber.
U.S. Appl. No. 61/177,058, filed May 11, 2009, priority document to U.S. Appl. No. 12/778,012.

\* cited by examiner

GENERATION OF NARROW LINE WIDTH HIGH POWER OPTICAL PULSES

BACKGROUND

1. Technical Field

Aspects of the present invention relate to lasers and particularly to a pulsed fibre laser topology for producing high power laser light with a narrow line width.

2. Description of Related Art

Ytterbium (Yb) doped fibre lasers are widely used in the wavelength range of 1030-1100 nanometer due to excellent beam quality and multi-kilowatt output power level capabilities. Such lasers have a wide variety of applications in material processing, spectroscopy, medicine, etc. Considerable efforts have been applied to extend the useable wavelength range of Yb-based fibre lasers beyond 1100 nanometer. Lasers emitting in the 1100-1200 nanometer wavelength range are of great interest for many applications in metrology, remote sensing, and medicine. There is also demand for high-brightness frequency doubled 1100-1200 nanometer lasers for producing yellow-orange sources for application in spectroscopy, laser guide star generation, and medicine, e.g. ophthalmology and dermatology applications.

There are several approaches for the achievement of emission wavelengths in the 1100-1200 nanometer range. One approach disclosed by Sinha, S. et al. (Opt. Lett. 31, 347, 2006) utilizes a property of Yb-doped silica to exhibit a gain up to 1200 nanometer. A challenge with this method is caused by strong gain competition from shorter wavelengths.

Another approach uses Raman converters. Stimulated Brillouin scattering (SBS) in continuous wave (CW) Raman converters limits the power obtained in this method to about 40 W.

In international patent application publication WO2003029851, an optical fibre device is based on the Raman effect in a holey optical fibre such that optical gain is provided at a second wavelength within the fibre.

In international patent application publication WO2007127356 and US patent application publication U.S.2006198397, a pulsed cascaded Raman laser is disclosed including a pulsed light source generating a pulsed light having an optical spectrum centered at a source wavelength and a Raman conversion fibre coupled the pulsed light source. The pulsed light traverses the nonlinear Raman conversion fibre and is converted by a cascaded Stimulated Raman Scattering process into pulsed light output corresponding to last Stokes order and having an optical spectrum centered at a first output wavelength which is longer than the source wavelength.

Emission in the required spectral range can be obtained from a new type of fibre laser based on the bismuth-doped silica glass optical fibre (E. M. Dianov et al., Quantum Electron. 35, 1083 (2005)). However, up to now the efficiency of these lasers is no higher than 20%.

Other alternatives have been proposed such as a cladding pumped Yb-doped photonic bandgap fibres for suppression of amplified spontaneous emission (ASE) at 1030 nanometer. However, complex system structure and therefore difficult fabrication conditions with the additional possibility of photodarkening, when pumped at 915-976 nanometer make such a laser impractical for industrial use.

Thus there is a need for and it would be advantageous to have a scalable, high power, narrow line width, pulsed fibre laser in the 1100-1200 nanometer range with high efficiency, high peak power, excellent beam quality, and narrow linewidth as a candidate for nonlinear frequency conversion such as by using second harmonic generation.

BRIEF SUMMARY

Various sources of optical radiation and methods for generation of narrow line width, high power pulses may be provided by enabling amplification by stimulated emission such as within an optical waveguide, e.g. optical fibre; and enabling stimulated Raman scattering within the optical waveguide. The sources of optical radiation may include a main fibre amplifier having a rare-earth doped optical fibre and a pump laser coupleable into the optical fibre. A first laser source and a second laser source may be coupled into the optical fibre. The first laser source emits radiation centered around a first wavelength and the second laser source emits radiation centered around a second wavelength other than the first wavelength. The optical radiation of the first source is amplified within the optical fibre. The first and second wavelengths are selected so that the second wavelength is shifted from the first wavelength by a frequency that is within a Raman frequency band of the optical fibre. Input power of the first laser source and optical gain of the main fibre amplifier are selected so that during amplification, the peak optical power within the optical fibre threshold leads to efficient stimulated Raman scattering into the optical mode of the second source. The optical output from the optical fibre is substantially centered around the second wavelength. The optical fibre is a rare-earth doped silica glass optical fibre such as a Ytterbium doped silica glass optical fibre. The optical fibre may be a photonic bandgap fibre. The first laser source may include an input laser source coupled to a preliminary fibre amplifier. An output of the preliminary fibre amplifier may be coupled to the main fibre amplifier. The second laser source may be a continuous wave laser source of spectral line width selected to determine spectral line width of the optical output of the main amplifier. Both first and second laser sources may be combined by a wavelength division multiplexer into a single fibre. A mode field adapter may couple the single mode fibre from the preliminary fibre amplifier to an input of the optical fibre of the main fibre amplifier. The optical fibre of the main fibre amplifier may be a large mode area double clad fibre. The optical fibre of the main fibre amplifier may be coiled to strip higher order modes to enable high beam quality.

Various methods are disclosed herein for generation of narrow line width, high power pulses of optical radiation including enabling amplification by stimulated emission within an optical fibre; and enabling stimulated Raman scattering within the optical fibre The optical fibre is a rare-earth doped glass, e.g. silica optical fibre.

The foregoing and/or other aspects will become apparent from the following detailed description when considered in conjunction with the accompanying drawing figures.

BRIEF DESCRIPTION OF THE DRAWINGS

The invention is herein described, by way of example only, with reference to the accompanying drawings, wherein.

DETAILED DESCRIPTION

Figure 1:
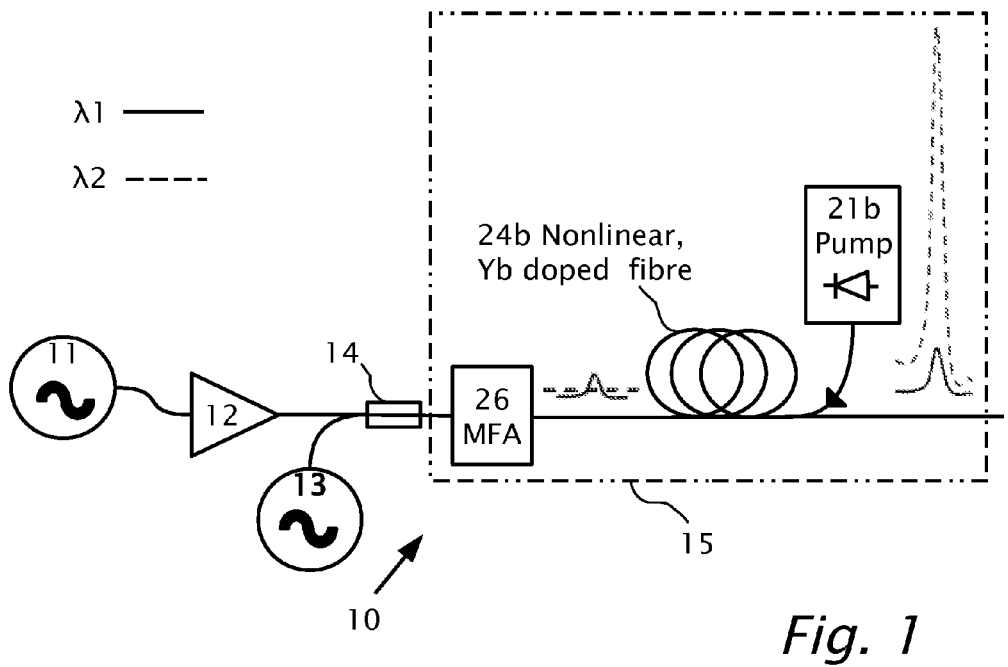
FIG. 1 illustrates a simplified block diagram of a dual stage master oscillator power amplifier (MOPA) configuration for producing narrow-line width high power pulses according to an embodiment of the present invention.

Reference will now be made in detail to features of the present invention, examples of which are illustrated in the accompanying drawings, wherein like reference numerals refer to the like elements throughout. The features are described below to explain the present invention by referring to the figures.

By way of introduction, embodiments of the present invention are directed to a novel method for emitting high power, narrow line width, laser pulses at 1130 nanometer for instance. A narrow band continuous wave (CW) diode laser at 1130 nanometer, and a pulsed broadband laser at 1080 nanometer are combined into a single-mode fibre, and are input to a Large-Mode Area (LMA) Yb amplifier. The 1080 nanometer pulsed laser is amplified to peak powers of tens of kilowatts, leading to efficient Raman conversion of energy into the 1130 nanometer mode. Due to the wide Raman scattering spectrum, different wavelengths can be generated by changing the wavelength of the Raman seed.

According to features of the present invention, temporal characteristics of the high power, narrow line width, laser pulses at 1130 nanometer are determined by the pulsed seed at 1080 nanometer, while the spectral properties are determined by the CW Raman seed. We thus create what is to our knowledge the first demonstration of a sub-100 picometer line width laser with multi-kiloWatt peak power and >15 Watt average power, at wavelengths that exceed 1120 nanometer using standard large mode aperture (LMA) Yb doped fibres. Excellent beam quality, high peak power and narrow line width of the extended wavelength nanosecond pulses are useful for single pass second harmonic generation (SHG) in an LBO crystal with >60% efficiency at a wavelength of 565 nanometer.

Referring now to the drawings, FIG. 1 illustrates a simplified block diagram of a dual stage master oscillator power amplifier (MOPA) configuration 10 for producing narrow-line width high power pulses in the 1100-1200 nanometer wavelength range, for example, 1130 nanometer, according to an embodiment of the present invention.

In the example shown of MOPA configuration 10, a combined Yb/Raman amplifier 15 may include a large mode area (LMA) doped optical fibre 24b. Using Yb/Raman amplifier 15 with LMA doped optical fibre 24b, we have demonstrated over 100 W average power at a wavelength of 1130 nm, and peak powers of up to 50 kW.

Furthermore, we have also demonstrated over 25 W of frequency doubled yellow light at a wavelength of 565 nm. The input to amplifier 15 may be a pulsed optical source 11 and a continuous wave (CW) seed optical source 13. Optical sources 11 and 13 may be combined in a single mode fibre, using wavelength division multiplexer (WDM) 14 suitably configured to combine the selected wavelengths $\lambda_1$ of pulsed laser source 11 and $\lambda_2$ of CW seed laser source 13. The combined optical output of WDM 14 is input to a second main stage of optical amplification, fibre amplifier 15. The input to Yb/Raman amplifier 15, being in a single mode fibre, overlap between respective spatial modes of optical sources 11 and 13 is optimal. The optical signal combined from sources 11 and 13 is mode matched to the lowest mode of large mode area doped LMA doped fibre 24b by a mode field Adapter MFA 26.

In combined Yb/Raman amplifier 15, the signal is amplified by stimulated emission of the rare-earth ions. Pump 21b power and length of fibre 24b are designed so that as the signal pulses propagate along fibre 24b of amplifier 15 the threshold power for stimulated Raman scatting (SRS) into the mode of source 13 is exceeded, and efficient SRS transfers nearly all the power into the mode seeded by source 13. The relative peaks of the two wavelengths $\lambda_1$ and $\lambda_2$ are shown schematically using solid lines and dotted lines respectively as shown in a key in the upper left of FIG. 1.

In master oscillator or pulsed laser source 11, for instance a pulsed fibre laser or a suitably pigtailed pulsed laser diode in a wavelength range e.g. 1030-1100 nanometer may be used. In the example, output of pulsed laser source 11 with wavelength centered at for example 1080 nanometer is input to a first stage or preliminary fibre amplifier 12. The optical output of fibre amplifier 12 is fibre coupled with the optical output of seed continuous wave (CW) laser source 13 emitting optical radiation centered at the desired wavelength of 1130 nanometer, for example. In an alternative embodiment of the present invention, laser source 13 may be a pulsed laser source synchronized to the pulses of pulsed laser source 11. In the example of configuration 10, a continuous wave CW seed laser source 13 is used.

Combined rare-earth doped Raman system 10 may be configured with polarization-maintaining (PM) fibres and components to allow efficient frequency doubling to yellow-orange wavelengths using a second harmonic generation crystal (SHG). The peak power of 1080 nanometer signal in fibre amplifier 15, along with the fibre amplifier length and properties, are configured to be high enough for Stimulated Raman Scattering (SRS) into the mode of the seed source 13. The optical radiation from seed CW laser source 13 is amplified by the SRS in optical amplifier 15, resulting in a narrow line width high power output pulses with high efficiency and beam quality.

Figure 2:
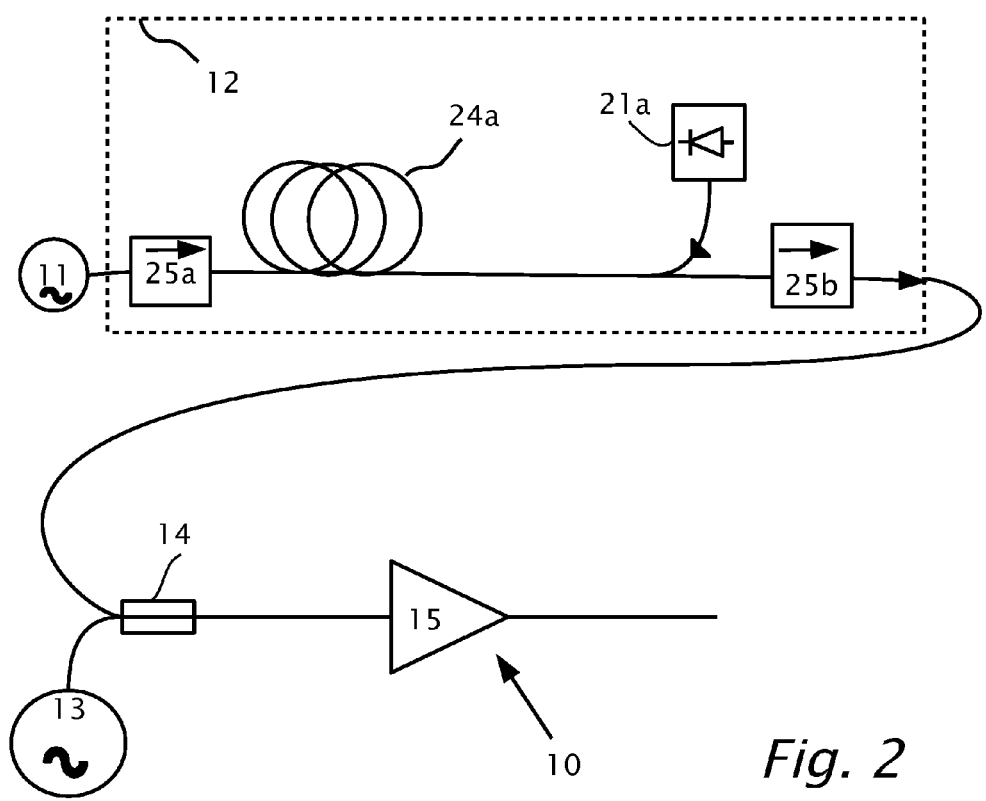
FIG. 2 illustrates in further detail aspects of dual-stage master-oscillator power amplifier (MOPA) configuration of FIG. 1.

The output of fibre amplifier 15 includes a narrow peak of optical radiation of wavelength 1130 nanometer which may be collimated by collimating optics Reference is now also made to FIG. 2 which illustrates further aspects of dual-stage master-oscillator power amplifier (MOPA) configuration 10 . Pulsed laser source 11 may be broadband and operates for instance at 1064 nanometer.

Pulsed laser source 11 may produce short pulses of (1-10 nanosecond duration, for instance) at repetition rates determined by the required average output power of MOPA 11. Peak power of pulsed laser source 11 may be 0.5 to 1 Watt. Pulsed laser source 11 may include an integrated fibre Bragg grating and may be pigtailed with a polarization-maintaining fibre. Pulsed laser source 11 feeds Ytterbium (Yb) doped preliminary fibre amplifier 12. An input optical isolator 25a may be coupled at the input of Yb doped fibre amplifier 12 configured to prevent back-reflection or back scattered light into pulsed laser source 11. The output of isolator 25a connects to Yb-doped fibre 24a configured to provide gain and desired peak output power. Yb-doped fibre 24a may be single mode double clad and/or other LMA fibre. Fibre amplifier 12 is pumped using one or more multi-mode laser modules 21a emitting light at 915 nanometer, for instance. In the example of system 10, pump laser radiation is coupled into Yb-doped fibre 24a and back-propagating. Alternatively, fibre amplifier 12 may be configured to be pumped with forward propagating pump laser radiation.

Narrow band seeder 13 may be a single mode laser source selected to be at the required wavelength and line width of the output of MOPA 10. Narrow band seeder 13 is coupled using WDM 14 with the optical signal output from fibre amplifier 12. Spectral characteristics of the output of MOPA 10 output are determined by narrow band seeder 13.

Second stage fibre amplifier 15 may be a Ytterbium (Yb) doped large mode area (LMA) fibre amplifier pumped using one or more multi-mode laser modules 21b emitting light at 915 nanometer, for instance. Pump 21b is shown in main amplifier 15 as backward propagating, however a forward propagating pump may alternatively be configured. Amplification may be achieved in a large mode area fibre 24b that can support the high peak power required (20 kW). Proper coiling of large mode area fibre 24b enables high beam quality ($M^2<1.2$).

Coupling between the single mode fibre at the input of fibre amplifier and the LMA fibre is performed using a mode field adapter 26.

The absorption cross section of the seed CW laser source 13 e.g. at 1130 nanometer is smaller than the emission cross section; therefore there is no considerable loss to the CW seed laser source 13.

Towards the end of the active fibre 24b, and in the following passive delivery fibre the peak power at 1080 nanometer is large enough that nonlinear phenomena occur in the fibre. Due to the broad line width of the 1080 nm seeder pulsed laser source 11, stimulated Brillouin scattering (SBS) is suppressed, and the dominant phenomenon is stimulated Raman scattering (SRS) into the seeded mode at 1130 nanometer. Most of the power (>80%) may be transferred to this mode, which may be frequency doubled in a nonlinear crystal such as LBO (Lithium triborate—$LiB_3O_5$).

The scheme is scalable to high output powers by increasing pulse repetition rate of pulsed laser source 11. We have demonstrated over 62 W at 1130 nm, limited only by the available 21b pump light at 915 nm (100 W in our case). The broad spectrum for Raman scattering lets amplification of a range of seed CW laser source 13 wavelengths with the same system 10 configuration. Furthermore, increasing the wavelength of pulsed laser source 11 allows Raman amplification of longer wavelengths.

Figure 3:
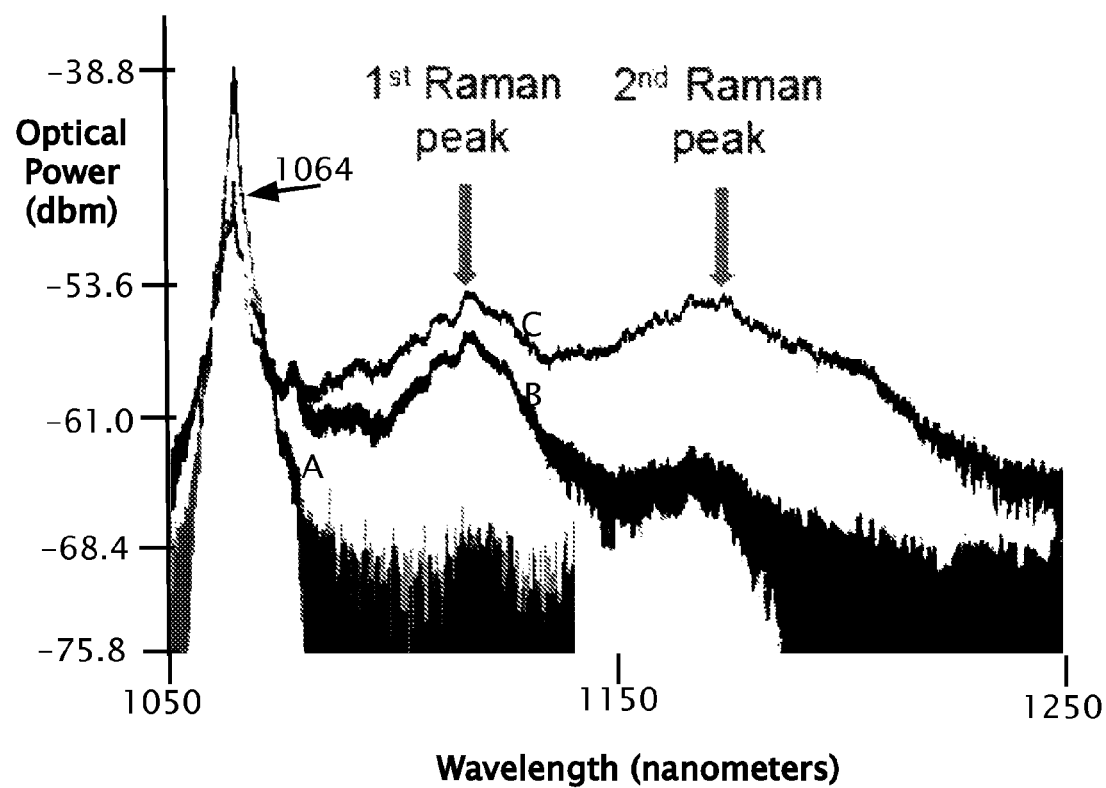
FIG. 3 illustrates a screen shot from an optical spectrum analyzer showing spontaneous Raman scattering.

Reference is now made to FIG. 3 which illustrates a screen shot from an optical spectrum analyzer. The screen shot of FIG. 3 shows an example of the spectra at the output of MOPA configuration 10 but without the 1130 nanometer seed CW laser source 13 operating. The vertical axis is an arbitrary logarithmic scale of optical power (dbm) as a function of wavelength in horizontal scale. Three traces are shown corresponding to various peak power levels labeled A for 12 kW peak power, B for 20 kW peak power and C for 22 kW peak power. The spectra shows spontaneous Raman amplification with Raman peaks around 1130 nanometer and 1180 nanometer wavelength.

When the power in the fibre approaches or exceeds a threshold, spontaneous Raman scattering is amplified, and a broad peak appears in the spectrum due to stimulated Raman scattering (SRS) into the initially unoccupied optical modes. When one of the modes in the Raman spectrum is seeded, it is amplified by the SRS process. When seeded with optical power from seed CW laser source 13, the optical power is efficiently converted from the wavelength of pulsed laser source 11 to the wavelength of seed CW laser source 13.

A simulation of the spectra was performed without and with a seed CW laser source 13 at 1130 nanometer for various peak power levels of the 1080 nanometer signal amplified from laser radiation originating at pulsed laser source 11. In both simulations, laser radiation at 1080 nanometer wavelength is inserted into five meters of a Large Mode Area fibre with a numerical aperture of 0.07, and a mode field diameter of 19.7 nanometer.

Results of the simulation show that the output spectrum without a seed CW laser source 13 is determined by the peak power and the Raman gain spectrum. Below a certain threshold, about 17 kW in this case, Raman scattering is negligible.

Based on the simulation, the spectrum of the Raman conversion is determined by the spectrum of seed CW laser source 13, and the conversion efficiency is close to 100% for a range of laser power at 1080 nanometer, starting from below the threshold for stimulated Raman scattering and limited by stimulated Raman scattering from the first Stokes mode into higher Stokes modes. The continuous wave simulations describe pulses of 1-10 ns quite well. The simulations do not include additional nonlinear effects such as stimulated Brillouin scattering (SBS), four-wave mixing, self phase modulation (SPM), and the presence of amplified spontaneous emission (ASE) seeded additional modes for Raman scattering. However it is possible to tailor parameters as to ensure these phenomena are not significant: Seed CW laser source 13 may be designed, (for instance with amplifier stage 12) to be above the ASE background, and pulsed laser source 11 may be chosen to be broad-band so that competing non linear effects such as stimulated Brillouin scattering and self-phase modulation are weak relative to stimulated Raman scattering.

In a working prototype system, pulsed laser source 11 operates at at 1080 nanometer to produce short (1-10 microseconds duration) pulses at repetition rates determined by the required average output power. Typical peak powers are 0.5 W. The pulses are amplified in single mode Yb-doped amplifier 12 to a typical peak power of 500 W. The output is then combined using a wavelength division multiplexer 14 with a narrow band CW laser source 13 at the required wavelength (1130 nanometer in the prototype). The combined signals are input to large mode area (LMA) Yb doped fibre amplifier 15. The final amplification is performed in a large mode area fibre 24b that can support the high peak power required (10-50 kW). The absorption cross section of the 1130 nanometer CW laser source 13 is smaller than the emission cross section; therefore there is no considerable loss to CW laser source 13. Amplifier 15 parameters (length, core area, and pumping power) are tailored so that towards the end of the amplification stage, the peak power at 1080 nanometer is large enough so that there is efficient stimulated Raman scattering (SRS) of the amplified 1080 nanometer signal into the mode seeded by CW laser source 13 at 1130 nanometer. Most of the power is transferred to this Raman mode. The Raman shifted mode is frequency doubled in a single pass through an LBO crystal. Over 1 Watt output was measured at 565 nanometer, with a conversion efficiency >60%.

Figure 4:
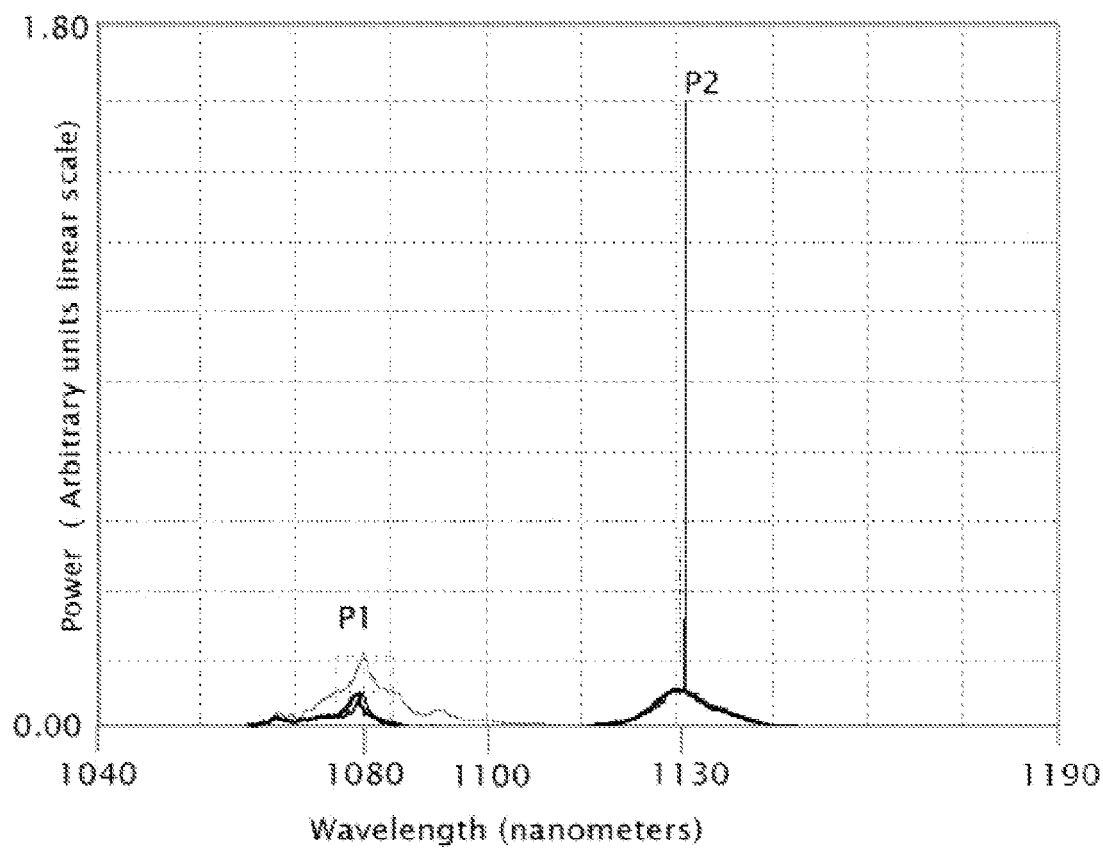
FIG. 4 illustrates a graph of an optical spectrum of measured results using MOPA configuration of FIG. 1.

Reference is now made to FIG. 4 which illustrates a graph of an optical spectrum of measured results using MOPA configuration 10. The ordinate is optical power in arbitrary units) as a function of optical wavelength in nanometer (abscissa).

Output spectra in the presence and in the absence of the 1130 nanometer CW laser source 13 are presented in FIG. 4. In the absence of the 1130 nanometer from CW laser source 13, the spectrum (shown as a grey trace P1) is that of the broadband 1080 nanometer pulsed laser source 11 and stimulated Raman scattering is negligible. In the presence of the 1130 nanometer CW laser source 13, most of the power is shifted to spectral peak P2 at 1130 nanometer which narrows to 80 picometer. Due to the large line width (~5 nanometer) of the 1080 nanometer pulsed laser source 11, stimulated Brillouin scattering (SBS) is suppressed, and the dominant phenomenon is stimulated Raman scattering into the seeded mode at 1130 nanometer. The limiting factor for peak power is SBS of the generated 1130 nanometer mode. However, because of the exponential growth, the power is substantial only towards the end of amplifier 15.

Figure 5:
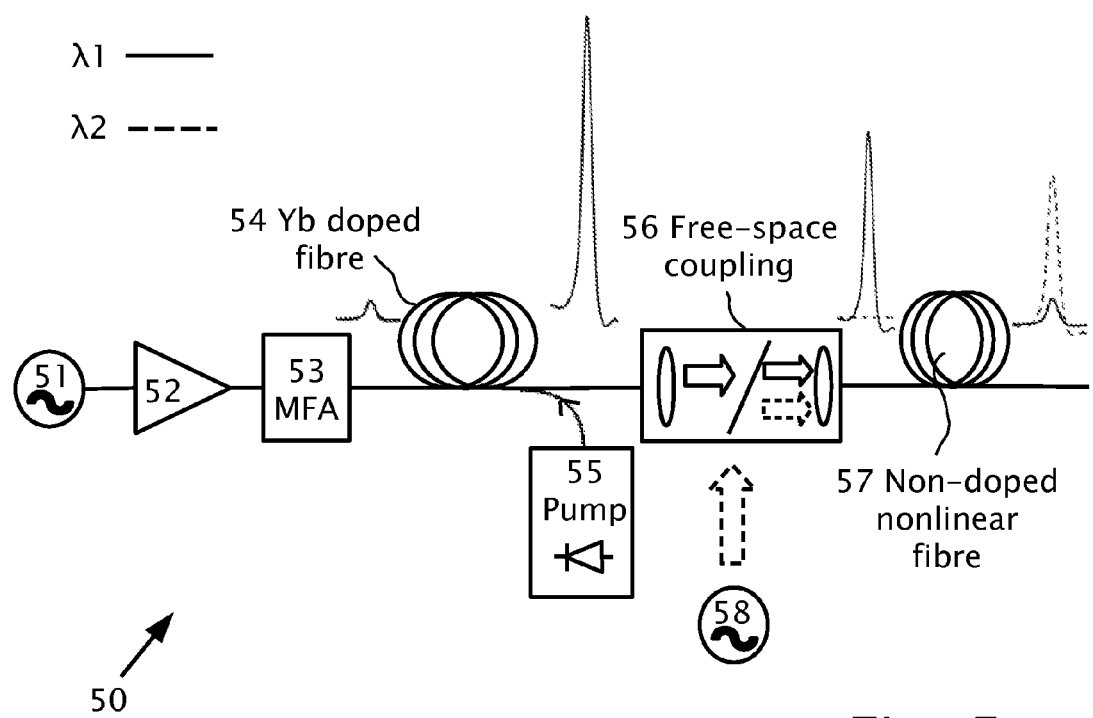
FIG. 5 illustrates an alternative embodiment of the present invention, including a rare-earth doped fibre amplifier followed by a Raman amplifier.

Reference is now made to FIG. 5 which illustrates a hybrid configuration 50 including a rare-earth doped fibre amplifier followed by a Raman amplifier. Inventiveness of system with Yb doped Raman fibre 24b may be shown by comparison with hybrid configuration 50. US2006198397 patent application publication and international patent application WO2007127356 describe a topology similar to that shown in hybrid configuration 50. Nevertheless, hybrid configuration 50 may have novel features over the prior art. Hybrid configuration 50 includes a rare-earth, e.g. Yb, doped large mode area fibre coupled using a free-space coupling 56 to a non-doped non-linear fibre 57. A first laser source 51 emitting a wavelength $\lambda_1$ is coupled through an optional optical fibre amplifier 52 to Yb doped fibre 54 through a mode field adapter (MFA) 53. A second seed laser source 58 emits a wavelength $\lambda_2$ and is coupled into non-linear fibre 57 using free-space coupling 57. The relative peaks of the two wavelengths $\lambda_1$ and $\lambda_2$ are shown schematically using solid lines and dotted lines respectively as shown in a key in the upper left of FIG. 5.

The combined Yb/Raman amplification in Yb/Raman amplifier configuration 10 of FIG. 1 has advantages over hybrid configuration 50 as follows:

1. In order to reach high peak powers without exceeding the threshold for damage and respective thresholds for unwanted non-linear phenomena such as stimulated Brillouin scattering (SBS), self-phase modulation (SPM), cross-phase modulation (XPM), four-wave mixing, large mode aperture (LMA) fibre may be used for both the Yb amplification stage, and the Raman amplifier stage. The combination of the pulsed signal with the seed is straightforward at low powers in single mode fibres, but LMA fibre wavelength division multiplexers are not commercially available and may not be feasible for powers as high as tens to hundreds of watts. Free-space coupling 56 may introduce extra optical loss, complexity, e.g. free-space alignment and cost.

2. The overall length of fibre 24b (FIG. 1) is shorter in combined Yb/Raman amplifier configuration 10 compared with the overall fibre length in hybrid configuration 50. The shorter fibre 24b leads to higher thresholds for non-linear phenomena. Since the overall power is ultimately limited by un-wanted nonlinear phenomena, a shorter fibre 24b allows higher peak powers.

In sum, using combined Yb/Raman amplifier configuration 10, it is possible to reach an average of hundreds of watts at the desired wavelength in an all fibre design while avoiding for instance free-space coupling. Moreover, combined Yb/Raman amplifier configuration 10 may be produced using commercially mature and available components which reduces the complexity, size and cost of laser sources at exotic wavelengths unachievable by rare-earth amplification alone.

A new approach has been disclosed herein for extending the spectral range of doped, e.g. Yb optical fibre laser toward 1100-1200 nanometer (in the case of Yb doping) with high efficiency. Narrow line width properties, high power levels and near diffraction limited beam quality has been achieved.

The architecture of Yb doped/Raman system 10 demonstrates the potential to achieve output power in excess of 100 W. This would open the door to high power yellow-orange light sources for medical applications and many more other useful applications.

The term "stimulated emission" as used herein refers to the well known quantum mechanical phenomenon which yields coherent electromagnetic radiation in lasers.

The terms "amplification" and "optical amplification" are used herein interchangeably to a physical mechanism used to amplify a light signal in doped waveguides to produce fibre amplifiers and bulk lasers, in which stimulated emission in the amplifier's gain medium causes amplification of incoming light. The dopant may include one or more rare-earth elements for examples Erbium, Ytterbium, Terbium, Thulium, Dysprosium and Holmium.

The term "peak power" as used herein refers to the highest optical power in the time domain and in pulsed laser systems may generally be approximated by the energy of the pulse divided by the time period of the pulse.

The term "line width" as used herein refers to the line width in the optical spectrum as measurable in an optical spectral analyzer and refers to the full width of the peak at half maximum.

The term "narrow" as used herein in the context of narrow line width narrow band, or narrow peak is about 1 nanometer or less in line width (full width half maximum).

The term "broad" as in broadband, broad line width or broad peak as used herein refers to a line width greater than 1 nanometer full width half maximum.

The term "centered" as used herein refers to a wavelength substantially at the center of a peak in the optical spectrum as measurable in an optical spectrum analyzer.

The term "Raman frequency band" refers to Raman scattering, an inelastic scattering process in which incident light at a first optical wavelength is inelastically scattered from vibrational modes in the optical material and thereby modulated into a second optical wavelength, different from the first optical wavelength. Raman frequency band is the optical frequency band for which Raman scattering wavelength shift may be expected based on the optical material.

The term "Stimulated Raman Scattering" as used herein refers to a known phenomenon in non-linear optics in which the Raman scattered light becomes coherent above a threshold of incident optical power.

The term "efficiency" as used herein refers conversion of optical power from from one wavelength to another wavelength. The term "high efficiency" refers to an optical power conversion of greater than 50%.

The term "photonic bandgap fibre" as used herein refers to an optical fibre containing, for instance, a depressed index core with a honeycomb lattice or an air core fibre with a triangular lattice of air holes. Unlike total internal reflection optical fibres, photonic band gap fibres use alternating layers of dielectric material. The periodic lattice gives rise to two-dimensional Bragg scattering forming a photonic band gap in the cladding. Frequencies which lie within the photonic band gap are not allowed to propagate within the cladding and are localized at any defect region, in this case the low index fibre core.

Photonic band gap guidance allows light to be guided within low loss core materials such as air or vacuum, potentially minimizing the effects of material loss and dispersion and allowing for high power transmission.

The parameter $M^2$ is a figure of merit for beam quality and is the ratio of the beam parameter product (BPP) of an actual beam to that of an ideal Gaussian beam at the same wavelength. The beam parameter product (BPP) is the product of a laser beam's divergence angle (half-angle) and the radius of the beam at its narrowest point (the beam waist)

The indefinite articles "a", "an" is used herein, such as "a pump laser", "optical fibre" have the meaning of "one or more" that is "one or more pump lasers" or "one or more optical fibres".

Although selected features of the present invention have been shown and described, it is to be understood the present invention is not limited to the described features. Instead, it is to be appreciated that changes may be made to these features without departing from the principles and spirit of the invention, the scope of which is defined by the claims and the equivalents thereof.

The invention claimed is:

1. A source of optical radiation for generation of narrow line width, high power optical pulses, the source including:
    a main fibre amplifier including an optical fibre and a pump laser coupleable into the optical fibre, wherein the optical fibre is a rare-earth doped silica glass optical fibre and wherein the optical fibre is a Large-Mode Area fibre configured to support optical peak power of at least ten kiloWatts;
    a first laser source coupleable into the optical fibre, wherein the first laser source is a pulsed laser source;
    a second laser source coupleable into the optical fibre;
    wherein the first laser source emits radiation centered around a first wavelength and the second laser source emits radiation centered around a second wavelength other than the first wavelength, wherein the optical radiation of the first laser source is amplified by stimulated emission of rare earth ions within the optical fibre, wherein the first and second wavelengths are selected so that the second wavelength is shifted from the first wavelength by a frequency that is within a Raman frequency band of the optical fibre, wherein input power of the first laser source and optical gain of the main fibre amplifier are selected so that during amplification, peak optical power within the optical fibre is substantially at or above a threshold for stimulated Raman scattering, wherein the narrow line width, high power optical pulses output from the optical fibre are substantially centered around the second wavelength, wherein the high power optical pulses output have less than 100 picometer line width and multi-kiloWatt peak power.

2. The source of optical radiation of claim 1, wherein the optical fibre is a Ytterbium doped silica glass optical fibre.

3. The source of optical radiation of claim 1, wherein the optical fibre is a photonic bandgap fibre.

4. The source of optical radiation of claim 1, wherein the first laser source includes an input laser source coupled to a preliminary fibre amplifier and wherein an output of the preliminary fibre amplifier is coupleable to the main fibre amplifier.

5. The source of optical radiation of claim 1, wherein the second laser source is a continuous wave laser source of spectral line width selected to determine spectral line width of the optical output of the main amplifier.

6. The source of optical radiation of claim 1, further comprising:
    a mode field adapter adapted to couple a single mode fibre to an input of the Large-Mode Area fibre.

7. The source of claim 6, wherein the optical signal combined from the first and second laser sources is mode matched to the lowest mode of the Large-Mode Area fibre.

8. The source of optical radiation of claim 1, wherein the optical fibre is coiled to strip higher order modes to enable high beam quality.

9. A method for generation of narrow line width, high power pulses of optical radiation, the method including:
    enabling coupling of a first laser source and a second laser source to a main fibre amplifier including the optical fibre and a pump laser, wherein the first laser source emits pulsed radiation centered around a first wavelength and the second laser source emits radiation centered around a second wavelength other than the first wavelength, wherein the optical fibre is a Large-Mode Area fibre configured to support optical peak power of at least ten kiloWatts;
    selecting the first and second wavelengths so that the second wavelength is shifted from the first wavelength by a frequency that is within a Raman frequency band of the optical fibre:
    enabling amplification by stimulated emission of rare-earth ions within an optical fibre of optical radiation originating from both the first and second laser sources;
    selecting input power of the first laser source and optical gain of the main fibre amplifier thereby enabling peak optical power during said amplification within the optical fibre to be above a threshold for stimulated Raman scattering; and
    enabling stimulated Raman scattering within the optical fibre, thereby producing the narrow line width, high power pulses having less than 100 picometer line width and multi-kiloWatt peak power.

10. The method of claim 9, wherein the optical fibre is a Ytterbium doped silica glass optical fibre.

11. The method of claim 9, further comprising:
    enabling coupling of an input laser source to an input of preliminary fibre amplifier; to produce the first laser source; and
    enabling coupling of the preliminary fibre amplifier to the main fibre amplifier.

12. The method of claim 9, further comprising:
    selecting spectral line width of the second laser source, thereby determining spectral line width of the optical radiation output of the main amplifier.

13. The method of claim 9, the method further comprising:
    enabling coupling a single mode fibre to the input of the Large-Mode Area fibre using a mode field adapter.

14. The method of claim 9, further comprising:
    coiling the optical fibre to strip higher order modes to enable thereby high beam quality.

15. The method of claim 9, further comprising:
    selecting line width of the first laser source thereby suppressing stimulated Brillouin scattering in the optical fibre.

16. The source of optical radiation of claim 1, wherein line width of the first laser source is selected to suppress stimulated Brillouin scattering in the optical fibre.

* * * * *